United States Patent [19]

Sumita et al.

[11] Patent Number: 4,967,189
[45] Date of Patent: Oct. 30, 1990

[54] CRT DISPLAYING METHOD IN NUMERICAL CONTROL DEVICES

[75] Inventors: Mutsutaka Sumita; Takayoshi Kurachi, both of Aichi, Japan

[73] Assignee: Mitsubishi Denki Kabushiki Kaisha, Tokyo, Japan

[21] Appl. No.: 408,966

[22] Filed: Sep. 18, 1989

[30] Foreign Application Priority Data

Sep. 22, 1988 [JP] Japan ................................. 63-237780

[51] Int. Cl.⁵ ............................................. G08B 21/00
[52] U.S. Cl. .................................. 340/679; 364/474.16
[58] Field of Search .................... 340/679; 364/474.16, 364/474.26, 474.32, 474.34, 474.37

[56] References Cited

U.S. PATENT DOCUMENTS 4,648,028  3/1987  DeKlotz et al. ............ 364/474.23 X

FOREIGN PATENT DOCUMENTS 62-129608  8/1987  Japan .

Primary Examiner—Joseph A. Orsino
Assistant Examiner—Thomas J. Mullen, Jr.
Attorney, Agent, or Firm—Sughrue, Mion, Zinn, Macpeak & Seas

[57] ABSTRACT

A CRT displaying method for use in a numerical control device for controlling a machining apparatus which is provided with a machining tool to machine a workpiece, for example a wire electric discharge machining apparatus. When an error condition occurs, an alarm code number corresponding to the error condition is displayed together with an alarm message corresponding to the alarm code number. Further, a manner how to escape from the error condition is obtained based on the alarm code number and an operational program so that an operator can move the machining tool easily to escape from the error condition according to the manner which is displayed on the CRT graphical and literally.

6 Claims, 4 Drawing Sheets

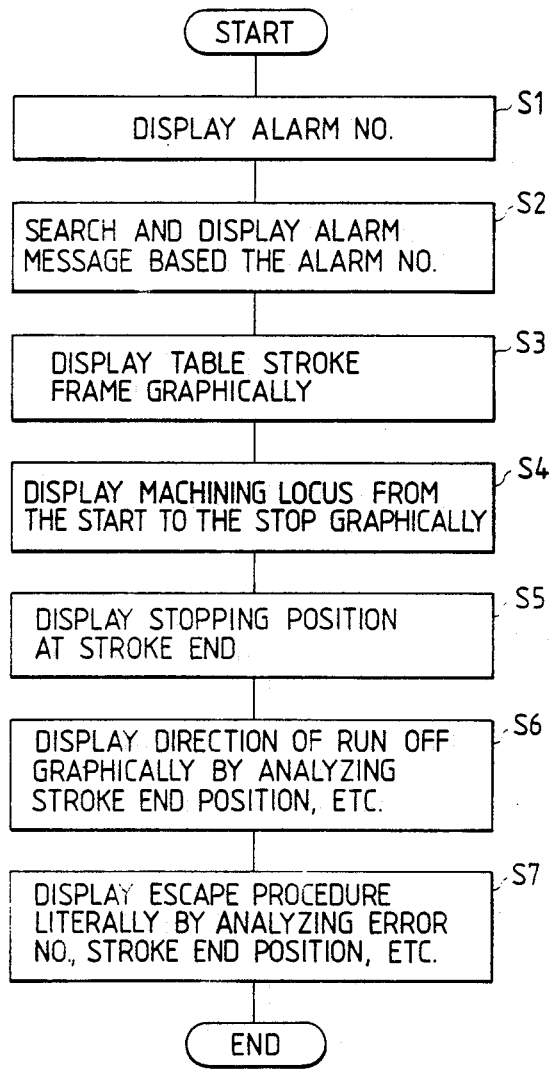

CRT DISPLAYING METHOD IN NUMERICAL CONTROL DEVICES

BACKGROUND OF THE INVENTION

The present invention relates to numerical control (NC) devices, and more particularly, to a method for displaying not only a code number and a message indicative of an alarm or an error condition which may occur during an operation of an apparatus controlled by the NC device but a manner how to escape from the alarm or error conditions on a CRT display for a numerical control device.

FIG. 1 is a schematic diagram showing an NC system including a CRT 9 and a numerical control device 8 controlling the CRT 9. The numerical control device includes a keyboard 10 for inputting data and instructions and a paper tape reader 11 for reading an operation program and data from an NC tape.

FIG. 2 is a diagram showing an example of display image which displays a code number indicative of an alarm, an alarm message and the like in conventional NC system.

The conventional CRT displaying method in the numerical control device will be described hereinafter with reference to FIGS. 1 and 2. Assuming that an electric discharge machining apparatus is controlled by the numerical control device 8, the numerical control device 8 first analyzes an NC program prepared by an operator, which is read out from the NC tape by the paper tape reader 11. The electric discharge machining apparatus performs the machining operation to obtain the programmed machining shape. When, for example, an alarm indicating an H/W stroke end where the machine is cut out of machining area limit occurs during the machining operation, the machining operation is stopped immediately, and an alarm code number corresponding to the alarm is set in an alarm code number area of a memory.

When the operator selects such a display as shown in FIG. 2. The content of the alarm is displayed according to the following manner on the CRT 9. The corresponding alarm message is searched based on the alarm code number to display on the CRT, the alarm code number in an alarm code number displaying area 12 and the alarm message in an alarm message displaying area 13 thereof, respectively.

The conventional CRT displaying method of numerical control devices is disadvantageous in that it takes long time to escape from an alarm or error condition because an operator's escaping operation is not performed until analyzing messages displayed on the CRT 9 or reading an instruction manual.

SUMMARY OF THE INVENTION

The present invention is made to solve the above-mentioned problem. It is an object of the invention to provide a CRT displaying method in numerical control devices. In the method, it is easy to escape from the alarm or error conditions because the operator is informed of an occurrence alarm or error conditions together with an escaping manner from that conditions during the numerically controlled machining operation by both graphical and literal representations.

The above, and other object of the present invention are accomplished by a CRT displaying method for use in a numerical control device for controlling a machining apparatus which has a machining tool to machine a workpiece, said displaying method comprising the steps of detecting an occurrence of an error condition during an operation of said machining apparatus, displaying an alarm code number assigned in advance to said error condition, said alarm code number being displayed in an alarm code number area on said CRT, displaying an alarm message corresponding to said alarm code number in an alarm message displaying area on said CRT, graphically displaying an manner how to escape from said error condition which is calculated based on said alarm code number and an operational program for said numerical control device, literally displaying said manner.

BRIEF DESCRIPTION OF THE DRAWINGS

In the accompanying drawings:

FIG. 4 is a flow chart of the escaping manner from an alarm of a stroke end according to the present invention.

DETAILED DESCRIPTION OF THE PREFERRED EMBODIMENTS

Figure 1:
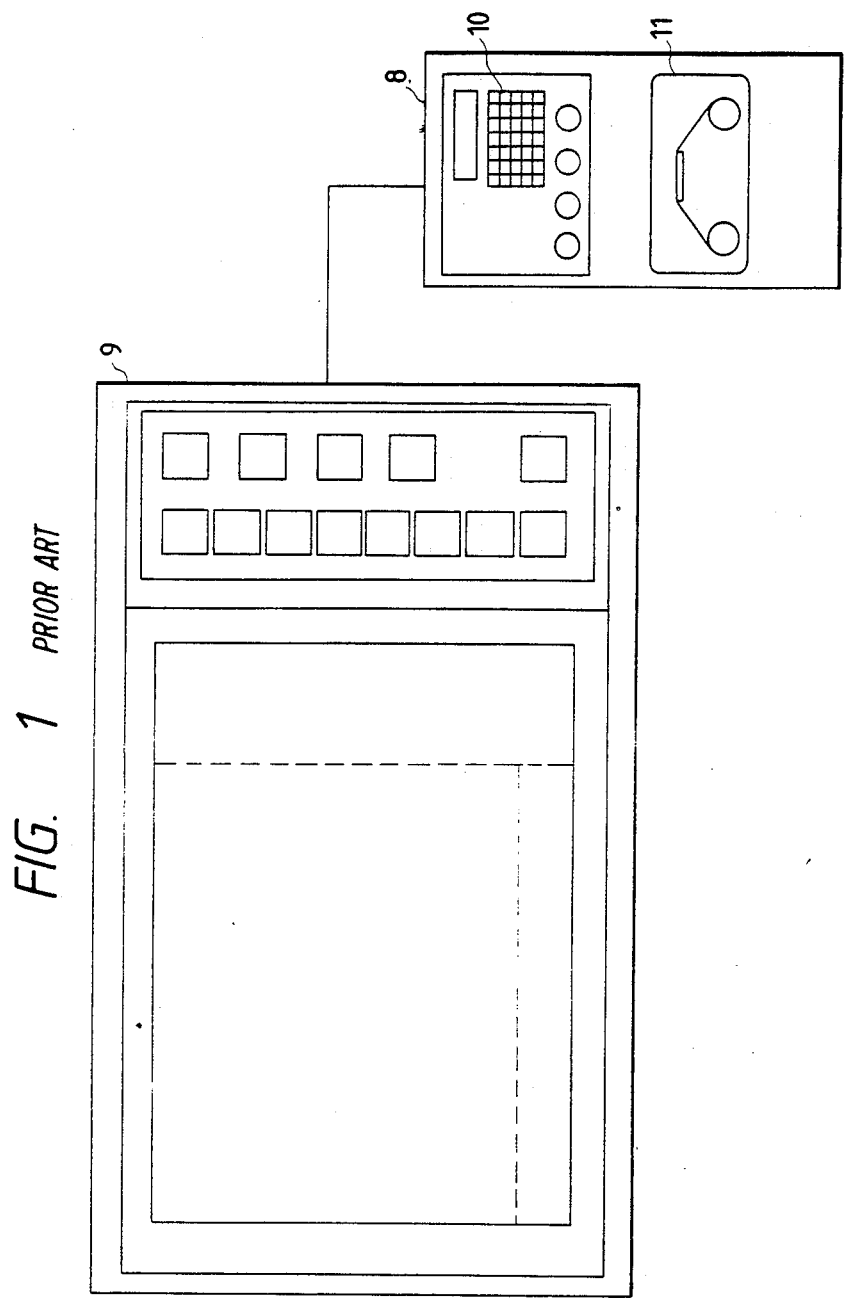
FIG. 1 shows the structure of a conventional numerical control device provided with a CRT.
Figure 2:
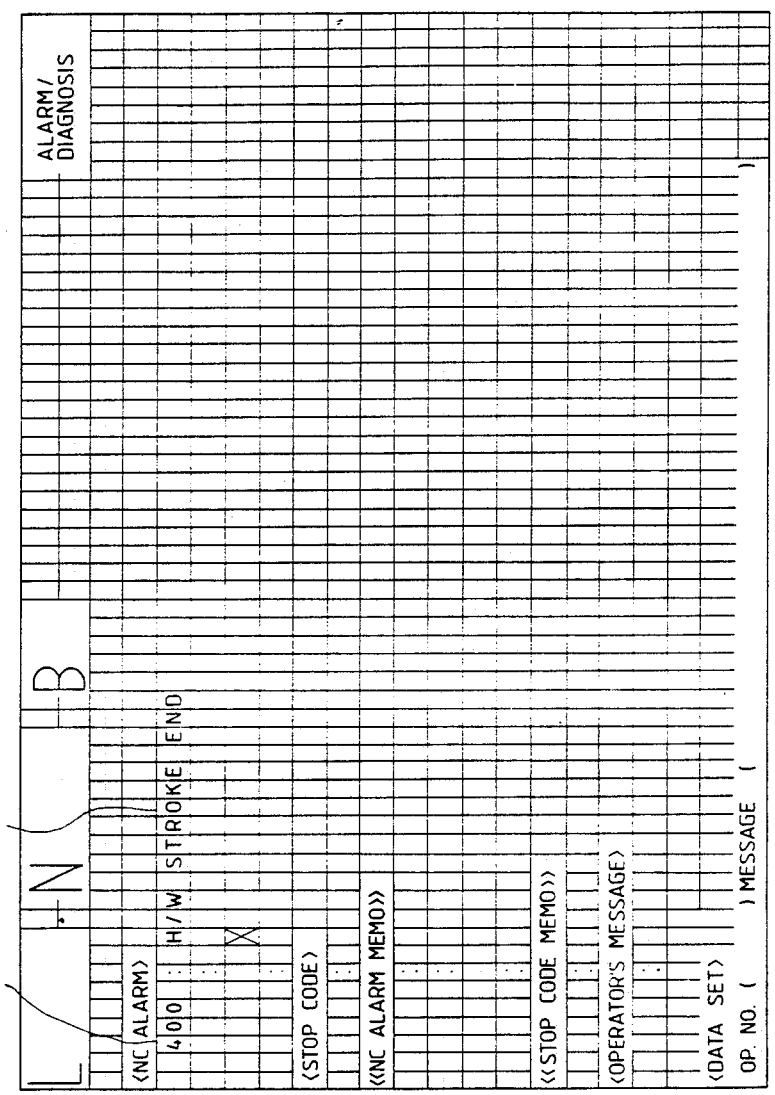
FIG. 2 is a diagram showing a CRT screen display for a conventional wire cut electric discharge machining apparatus which is numerically controlled by the device of FIG. 1.
Figure 3:
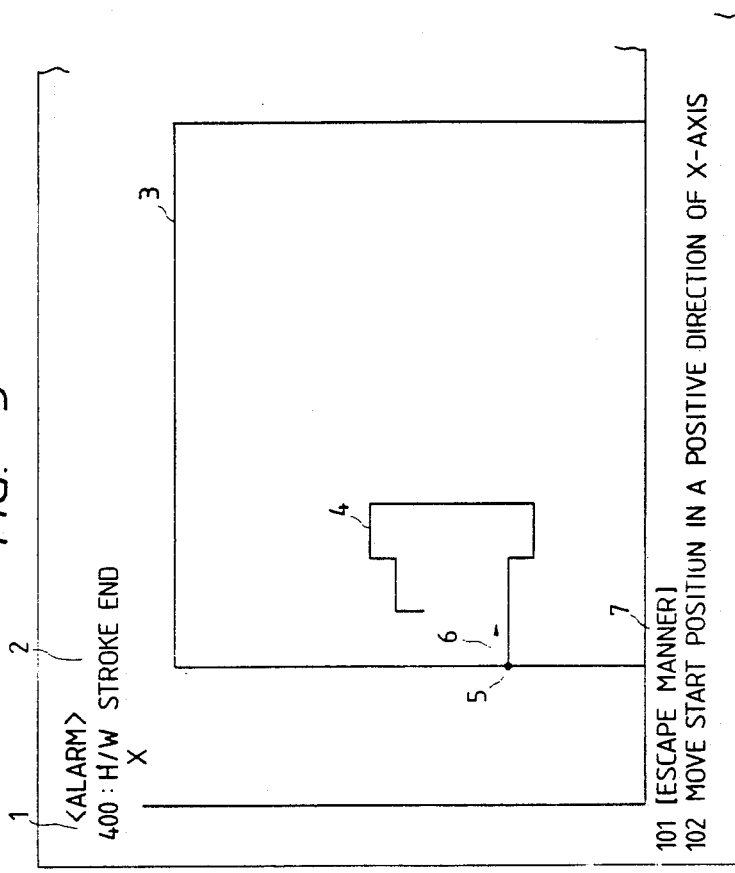
FIG. 3 is a diagram showing an example of a CRT display for a wire cut electric discharge machining apparatus according to the present invention.

Referring to the figures, an embodiment of the invention will be described below. FIG. 3 is a schematic diagram showing an example of a display on a CRT 9 according to the present invention. When a tool arrives at a stroke end beyond which an apparatus is out of a machining area limit, occurs in the wire cut electric discharge machining apparatus. There are provided an alarm code number area 1, an alarm message area 2, and an area 7 for displaying a message as to the how to escape from the stroke end. In the display, a table stroke frame 3 indicates the possible machining area, a line 4 indicates a machining locus 4, a position 5 indicates a tool stop point at the stroke end, and an arrow 6 indicates a direction in which the tool is allowed to escape.

The operation will be described hereinafter.

When an alarm indicative of an H/W stroke end occurs during a machining operation, the machining is stopped immediately and an alarm code number is set in the alarm number area of a memory.

Referring to the flow chart in FIG. 4, it will be explained how to display a picture image shown in FIG. 3 on the CRT 9 after an operator's selection for the image.

When the operator selects the image of FIG. 3, the alarm code number is displayed in the alarm code number area 1 as shown in a step S1 of FIG. 4. Then, the alarm message corresponding to the alarm code number is searched to be displayed in the alarm message displaying area 2 as shown in a step S2.

Then, as shown in a step S3, the possible range of machining of the electric discharge machining apparatus is obtained by an analysis of a machining program or the like, so that the possible range, i.e., a table stroke frame is graphically displayed on the CRT 9. Then, as shown in a step S4, the machining locus is displayed graphically from the start point of machining to stop point. Then, as shown in a step S5, the position where the machining tool is prevented from advancing at the stroke end is displayed graphically. Then, as shown in a step S6, a direction in which the tool can be allowed to escape, is computed through the analysis of the stroke end position and the machining program to be displayed on the CRT 9. Finally, as in a step S7, the manner how to escape from the stroke end position is obtained based on the analysis of the alarm number, the stroke end position and the machining program, so as to be literally displayed in the escaping manner displaying area 7.

To this end, the operator can be notified of the occurrence of the error condition and/or the alarm therefor by manner of both the literal representation of the steps S1 and S2 and the graphical representation of the steps from S3 to S5; and the operator can be also notified of the escape manner by both the literal representation of the step S7 and the graphical representation of the step S6.

Because it is possible to display the escaping manner in the graphical representation and the literal representation simultaneously even if the alarm or error occurs during the numeral controlled machining operation, the present invention is advantageous in that it is easy to escape from the alarm or error conditions.

Though the above embodiment is directed to the escape from the error of a stroke end, it is clear that other embodiments for different alarms and errors is possible and have the same effect as the above embodiment has. That is, many different modifications of the present invention may be possible without departing from the spirit and scope of the present invention. It should be understood that the present invention is not limited to the specific embodiment described in the specification.

What is claimed is:

1. A CRT displaying method for use in a numerical control device for controlling a machining apparatus which is provided with a machining tool to machine a workpiece, said displaying method comprising the steps of:
   detecting the occurrence of an error condition during an operation of said machining apparatus;
   displaying an alarm code number assigned in advance to said error condition, said alarm code number being displayed in an alarm code number area on said CRT;
   displaying an alarm message corresponding to said alarm code number in an alarm message displaying area on said CRT;
   graphically displaying a manner of how to escape from said error condition which manner is identified based on said alarm code number and an operational program for said numerical control device; and
   literally displaying said manner.

2. A CRT displaying method as claimed in claim 1, wherein said machining apparatus is a wire cut electric discharge machining apparatus.

3. A CRT displaying method as claimed in claim 1, wherein said alarm code number displaying step comprises the steps of:
   setting said alarm code number in an alarm number area of a memory; and
   selecting a picture image for displaying said alarm to display said manner of escaping.

4. A CRT displaying method as claimed in claim 1, wherein said alarm message is searched based on said alarm code number.

5. A CRT displaying method as claimed in claim 4, wherein said alarm message is searched in a memory device of said numerical control device.

6. A CRT displaying method as claimed in claim 1, wherein said escape manner graphically displaying step includes:
   analyzing said machining program to obtain a possible range of machining of said numerical control device;
   graphically displaying said possible range of machining;
   graphically displaying a machined locus;
   graphically displaying a position where said machining tool is prevented from advancing; and
   analyzing said possible range of machining, said machining program, said machined locus and said position of tool to obtain a direction to escape.

* * * * *